(12) United States Patent
Denda et al.

(10) Patent No.: US 12,398,764 B2
(45) Date of Patent: Aug. 26, 2025

(54) FRICTION PLATE HAVING A GROOVE PATTERN FORMED BY MEANS OF FRICTION LINING PADS

(71) Applicant: Schaeffler Technologies AG & Co. KG, Herzogenaurach (DE)

(72) Inventors: Christian Denda, Achern (DE); Tobias Hebgen, Bühl (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 0 days.

(21) Appl. No.: 18/563,278

(22) PCT Filed: May 5, 2022

(86) PCT No.: PCT/DE2022/100348
§ 371 (c)(1),
(2) Date: Nov. 21, 2023

(87) PCT Pub. No.: WO2022/258100
PCT Pub. Date: Dec. 15, 2022

(65) Prior Publication Data
US 2024/0229871 A1    Jul. 11, 2024

(30) Foreign Application Priority Data

Jun. 7, 2021 (DE) .................. 10 2021 114 508.2
Aug. 4, 2021 (DE) .................. 10 2021 120 275.2

(51) Int. Cl.
*F16D 13/64* (2006.01)
*F16D 13/72* (2006.01)
*F16D 69/00* (2006.01)

(52) U.S. Cl.
CPC .......... *F16D 13/648* (2013.01); *F16D 13/72* (2013.01); *F16D 2069/004* (2013.01)

(58) Field of Classification Search
CPC ......... F16D 13/00–74; F16D 2069/004; F16D 2069/009
See application file for complete search history.

(56) References Cited

U.S. PATENT DOCUMENTS 5,669,474 A    9/1997 Dehrmann et al.
5,878,860 A    3/1999 Pavangat et al.
(Continued)

FOREIGN PATENT DOCUMENTS

DE    102018105214 A1    9/2019
DE    102018105215 A1    9/2019
(Continued)

*Primary Examiner* — Ernesto A Suarez
*Assistant Examiner* — Lillian T Nguyen (57) ABSTRACT

A frictional surface for an annular wet friction system with external lubrication includes a groove pattern with first pentagonal friction lining pads, second pentagonal frictional lining pads, and a groove. The first pentagonal friction lining pads are arranged radially outwards in a first row and the second pentagonal friction lining pads arranged radially inwards in a second row. The groove extends circumferentially between the first pentagonal friction lining pads and the second pentagonal friction lining pads in a zigzag or undulating manner. In an embodiment, each of the first pentagonal friction lining pads has a triangular geometry with a first tip directed radially inwards and each of the second pentagonal friction lining pads has a triangular geometry with a second tip directed radially outwards.

5 Claims, 11 Drawing Sheets

(56) References Cited

U.S. PATENT DOCUMENTS

| | | | |
|---|---|---|---|
| 8,205,734 | B2 | 6/2012 | Sudau et al. |
| 8,474,590 | B2 | 7/2013 | Fabricius et al. |
| 10,502,269 | B2 | 12/2019 | Takakura et al. |
| 11,067,133 | B2 | 7/2021 | Tepper et al. |
| 2012/0118696 | A1* | 5/2012 | Fabricius ................ F16D 13/72 |
| | | | 192/107 R |
| 2012/0175216 | A1 | 7/2012 | Hiramatsu et al. |
| 2017/0254368 | A1* | 9/2017 | Hartner ................ F16D 13/683 |
| 2017/0363154 | A1 | 12/2017 | Heitzenrater et al. |
| 2018/0216674 | A1* | 8/2018 | Takakura ................ F16D 13/74 |
| 2018/0328415 | A1 | 11/2018 | Langenkaemper et al. |
| 2018/0372166 | A1 | 12/2018 | Carey et al. |
| 2019/0345988 | A1 | 11/2019 | Dannwolf et al. |
| 2020/0049206 | A1* | 2/2020 | Tepper ................ F16D 65/128 |
| 2020/0393004 | A1 | 12/2020 | Tepper |

FOREIGN PATENT DOCUMENTS

| | | | | |
|---|---|---|---|---|
| EP | 2028382 | B1 | 4/2014 | |
| EP | 3374652 | B1 | 7/2020 | |
| JP | 2004211781 | A | 7/2004 | |
| WO | WO-2016180540 | A1 * | 11/2016 | ........... F16D 13/648 |
| WO | 2019/120370 | A1 | 6/2019 | |
| WO | 2022033631 | A1 | 2/2022 | |

\* cited by examiner

FRICTION PLATE HAVING A GROOVE PATTERN FORMED BY MEANS OF FRICTION LINING PADS

CROSS-REFERENCE TO RELATED APPLICATIONS

This application is the United States National Phase of PCT Appln. No. PCT/DE2022/100348 filed May 5, 2022, which claims priority to German Application Nos. DE102021114508.2 filed Jun. 7, 2021 and DE102021120275.2 filed Aug. 4, 2021, the entire disclosures of which are incorporated by reference herein.

TECHNICAL FIELD

The present disclosure relates to a wet multiple disc brake with external oiling.

BACKGROUND

Wet multiple disc clutches and brakes are widely used in conventional power-shiftable transmissions, in hybrid modules in heavy-duty drive trains or in shiftable e-axles, and they represent high-performance, heavy-duty components. The demands for lower $CO_2$ emissions and improved efficiency of drive trains in automotive applications are of great importance. In addition to the reduction of load-independent losses in shifting elements, the thermal load and sufficient cooling must be considered. The groove pattern of the friction disc plays a central role in the trade-off between friction characteristics, thermal balance, and efficiency.

WO 2019/120 370 A1 as well as U.S. Pat. No. 8,474,590 B2 and EP 3 374 652 B1 each disclose annular wet friction parts with grooves in the frictional surface.

In the case of annular wet friction systems with external lubrication—also referred to as external oiling in the context of this publication—and in particular in the case of multiple disc brakes with external oiling (cf. FIG. 2), proven groove patterns (as for internal oiling) cannot be used.

SUMMARY

The present disclosure is directed to improving the convective cooling/cooling effect and minimizing drag losses in wet friction systems with external lubrication, for example in multiple disc brakes with external oiling, by means of a suitable groove pattern.

The present disclosure provides a groove pattern for an annular wet friction system with external lubrication. For example, the annular wet friction system is a wet multiple disc brake with external oiling.

The groove pattern according to the disclosure for an annular wet friction system with external lubrication thus provides that the frictional surface has a circumferential groove extending across the circumference in a zigzag or undulating manner.

In wet friction systems with external lubrication, such a groove pattern improves the cooling effect and reduces drag losses.

In an exemplary embodiment of the groove pattern, the circumferential groove extending across the circumference in a zigzag or undulating manner is arranged, in the radial direction, between first pentagonal friction lining pads arranged radially outwards in a first row of pads and second pentagonal friction lining pads arranged radially inwards in a second row of pads. The first and second pentagonal friction lining pads create a double row groove pattern with a circumferential groove extending across the circumference in a zigzag or undulating manner. The circumferential groove extending across the circumference in a zigzag or undulating manner may be arranged centrally between the first pentagonal friction lining pads and the second pentagonal friction lining pads. The first pentagonal friction lining pads may be substantially of the same design. The same applies to the second pentagonal friction lining pads.

In a further exemplary embodiment of the groove pattern, the first and second pentagonal friction lining pads have a rectangular geometry with an immediately adjacent triangular geometry, wherein tips of the triangular geometry of the first pentagonal friction lining pads are directed radially inwards and tips of the triangular geometry of the second pentagonal friction lining pads are directed radially outwards. The size and shape of the triangular geometry of the first and second pentagonal friction lining pads allows the shape and size of the circumferential groove extending across the circumference to be varied and adapted to a desired requirement profile.

In a further exemplary embodiment of the groove pattern, first radial grooves are arranged in the circumferential direction between the first pentagonal friction lining pads, in each case, and second radial grooves are arranged in the circumferential direction between the second pentagonal friction lining pads, in each case. The tips of the triangular geometry of the first pentagonal friction lining pads face the second radial grooves, and the tips of the triangular geometry of the second pentagonal friction lining pads face the first radial grooves. The first radial grooves and the second radial grooves each open into the circumferential groove extending across the circumference in a zigzag or undulating manner.

In a further exemplary embodiment of the groove pattern, the first pentagonal friction lining pads have a V-shaped double groove. A V-shaped double groove means, with regard to the first pentagonal friction lining pads, that they have two grooves, each of which is arranged in a V-shape. The two grooves arranged in a V-shape are spaced apart from one another in the circumferential direction, and the distance between the grooves of the double groove decreases radially outwards. A groove angle enclosed by the two grooves of the double groove may be between twenty and thirty degrees, e.g., 24.3 degrees. The two grooves of the V-shaped double groove can be designed as embossed grooves. The two grooves of the V-shaped double groove can also be designed as segmentation grooves. If required, one of the grooves of the V-shaped double groove can also be designed as an embossed groove, while the other of the two grooves of the V-shaped double groove is designed as a segmentation groove.

In a further exemplary embodiment of the groove pattern, at least two second pentagonal friction lining pads are integrally connected to each other and are divided only by an embossed groove. According to an exemplary embodiment, two second pentagonal friction lining pads are integrally connected to each other in each case. According to a further exemplary embodiment, three second pentagonal friction lining pads are integrally connected to each other. According to a further exemplary embodiment, all second pentagonal friction lining pads are integrally connected to each other. The second pentagonal friction lining pads connected to each other are divided by an embossed groove in each case.

In a further exemplary embodiment of the groove pattern, pad inner angles in pad corners of the first and second pentagonal friction lining pads are between ninety and one hundred and fifty degrees. This angular range has proven to be advantageous with regard to the desired effect in the operation of the groove pattern.

In a further exemplary embodiment of the groove pattern, all pad corners are rounded along their circumferential contour. The rounding radii may be greater than or equal to one millimeter.

In a further exemplary embodiment of the groove pattern, the first and second friction lining pads have widths and heights that have a width to height ratio that is greater than one and less than three. The width to height ratio of the first pentagonal friction lining pads may be 2.58. The width to height ratio of the second pentagonal friction lining pads may be 2.33.

In a further exemplary embodiment of the groove pattern, a radial flow cross-section between the first pentagonal friction lining pads is larger than a radial flow cross-section between the second pentagonal friction lining pads. The radial flow cross-section is defined by the size of the radial grooves between the first and second pentagonal friction lining pads, respectively. In this regard, the radial grooves can be segmentation grooves as well as embossed grooves.

The present disclosure further relates to a friction lining pad for a groove pattern described above. The friction lining pads can be traded separately.

BRIEF DESCRIPTION OF THE DRAWINGS

Further advantages and advantageous configurations of the present disclosure are the subject of the following figures and the description thereof.

In the figures.

DETAILED DESCRIPTION

Figure 1:
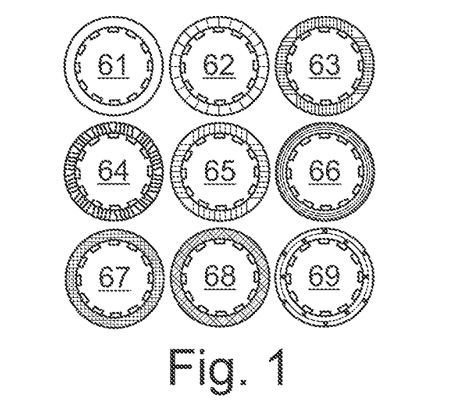
FIG. 1 shows various known patterns of common grooving of friction linings.

Various known groove patterns 62 to 69 are shown in plan view in FIG. 1. A friction disc with a frictional surface not equipped with grooves is designated with 61. Radially on the inside, the friction disc has an internal toothing for hooking the friction disc into a multiple disc carrier (not shown).

The groove pattern 62 comprises radial grooves. The groove pattern 63 comprises cross grooves. The groove pattern 64 comprises parallel grooves arranged in groups. The groove pattern 65 comprises blind grooves arranged crosswise. The groove pattern 66 comprises spiral grooves. The groove pattern 67 comprises intersecting grooves. The groove pattern 68 comprises sunburst grooves. The groove pattern 69 comprises an annular groove with pressure relief holes.

The groove patterns are used to cool the discs with a flow of oil, even when the shifting element is closed. In addition, the grooves serve to cut the oil film and thereby stabilize the friction coefficient. In this way, a desired friction behavior is created in a shift. When the shifting element is in the open state, the drag torque can be influenced and reduced by the grooves.

Figure 2A:
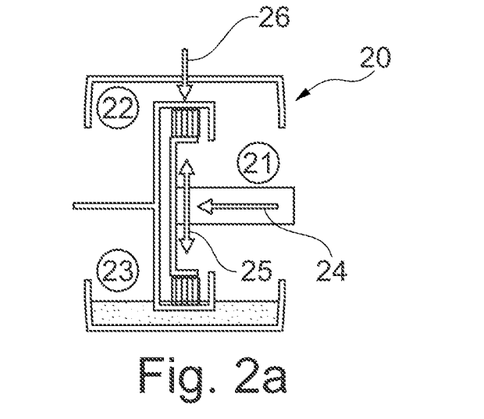
FIGS. 2a and 2b show a wet multiple disc brake with external oiling.
Figure 2B:
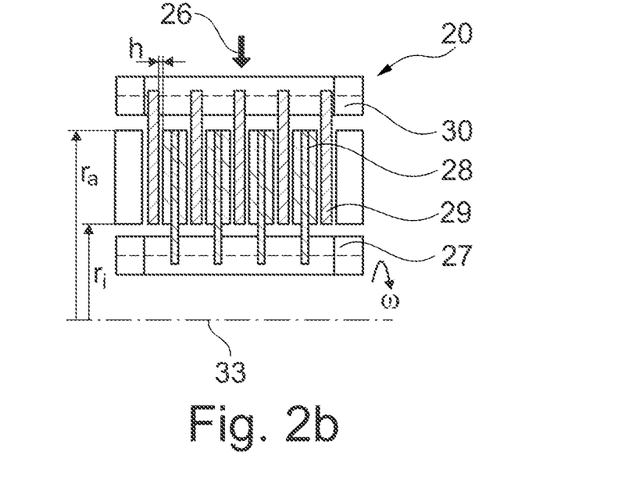

In FIGS. 2a and 2b, a wet multiple disc brake 20 is shown schematically in different views. FIG. 2a shows various lubrication systems 21, 22 and 23 of wet multiple disc clutches or multiple disc brakes. The lubrication systems 21 to 23 can be implemented differently for wet multiple disc clutches and brakes, depending on the application.

In general, the cooling oil of the friction systems is supplied from the inside either actively, for example in the case of double clutches with pressure oiling, or passively, for example in shifting elements in stepped automatic transmissions with passive oil distribution in the transmission, as illustrated by an arrow 24 and a double arrow 25. Depending on the design of the transmission, the friction system can also be operated in an oil bath, as suggested for 23. In the special case of multiple disc brakes, such as those used in stepped automatic transmissions, hybrid transmissions or e-axles, active oiling from the outside can be useful, as indicated by an arrow 26 for 22.

An arrow in FIG. 2b indicates that an inner multiple disc carrier 27 of the wet multiple disc brake 20 rotates at a speed ω. One of a total of four friction discs 28 is suspended in the inner multiple disc carrier 27. The friction discs 28 are connected to the inner multiple disc carrier 27 in a non-rotatable manner by means of a corresponding internal toothing.

The friction discs 28 are each arranged axially between two steel discs 29 which are connected in a non-rotatable manner to an outer multiple disc carrier 30 of the wet multiple disc brake 20. The arrows $r_i$ and $r_a$ indicate an inner radius and an outer radius of annular disc-like frictional surfaces between the steel discs 29 and the friction discs 28 when the wet multiple disc brake 20 is closed. An arrow h in FIG. 2b shows that the steel discs 29 are spaced apart from the friction discs 28 in the axial direction when the multiple disc brake 20 is in the open state. The term "axial" refers to a rotational axis 33 of the wet multiple disc clutch 20.

Discs brakes are generally used as internal shifting elements for shifting under load in planetary gear transmissions. Wet discs brakes 20, as shown in FIGS. 2a and 2b, are used in automatic transmissions, DHT transmissions and/or in multi-speed e-axles.

Figure 3A:
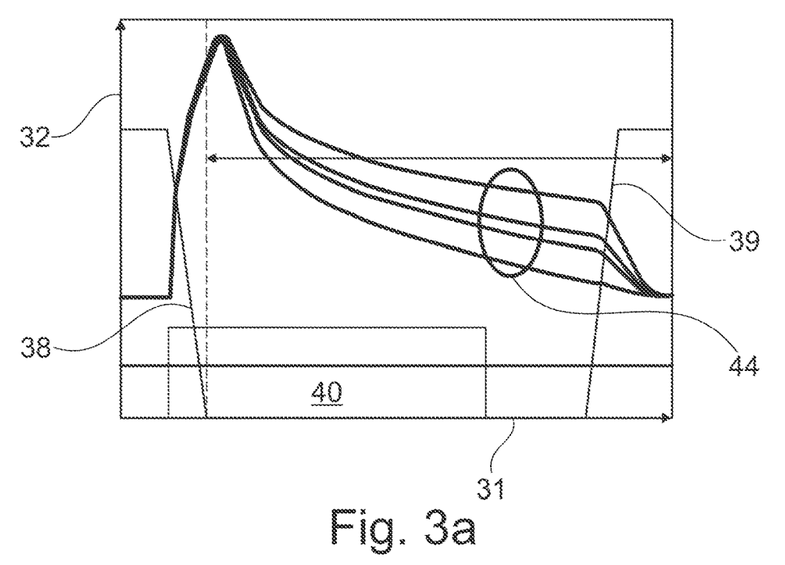
FIG. 3a shows a schematic temperature curve of a friction disc with external oiling.
Figure 3B:
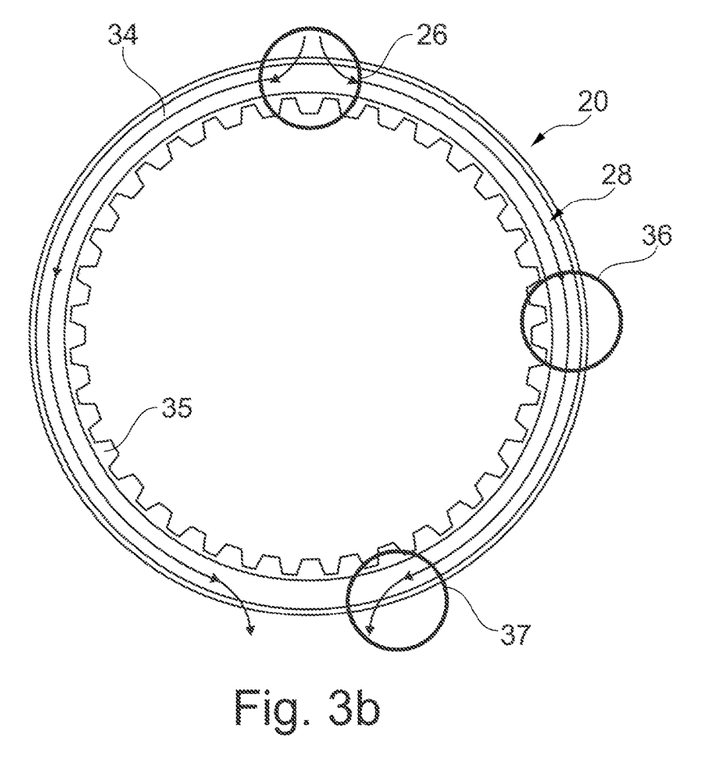
FIG. 3b shows oil routing and cooling in a closed state of the friction disc with external oiling.

FIG. 3b shows the wet multiple disc brake 20 in a plan view on a friction disc 28. In a circle 26, arrows indicate an oil supply from the outside for cooling the multiple disc brake 20 in the closed state. In a circle 36, it is indicated that a suitable groove pattern is intended to direct a cooling oil flow along the circumference of the friction ring to thereby provide complete, uniform as well as effective convective cooling of the friction system after a shifting event. An exit of the cooling oil is indicated by a circle 37. The cooling oil flow should exit at the lowest point of the friction system, as far as possible. A premature outflow of the cooling oil on the inner diameter at the oil entry point and/or along the circumference on the outer diameter should be prevented or minimized.

The friction disc 28 is equipped with a frictional surface 34 and an internal toothing 35. A desired groove pattern is provided in the frictional surface 34.

A Cartesian coordinate diagram with an X-axis 31 and a Y-axis 32 is shown in FIG. 3*a*. A time in a suitable time unit is plotted on the X-axis 31. A temperature or a speed is plotted on the Y-axis 32 in a suitable unit in each case. In a rectangle 40, the multiple disc brake is closed. To the right of the rectangle 40, the multiple disc brake is open. 38 illustrates a speed drop on closing of the multiple disc brake. 39 illustrates a speed increase on opening of the multiple disc brake. In an ellipse 44, non-uniform temperature distributions can be seen on the circumference of the multiple disc brake due to a non-uniform cooling oil distribution. When the brake is closed, the friction discs and the steel discs in the disc pack of the multiple disc brake are pressed together.

Figure 4A:
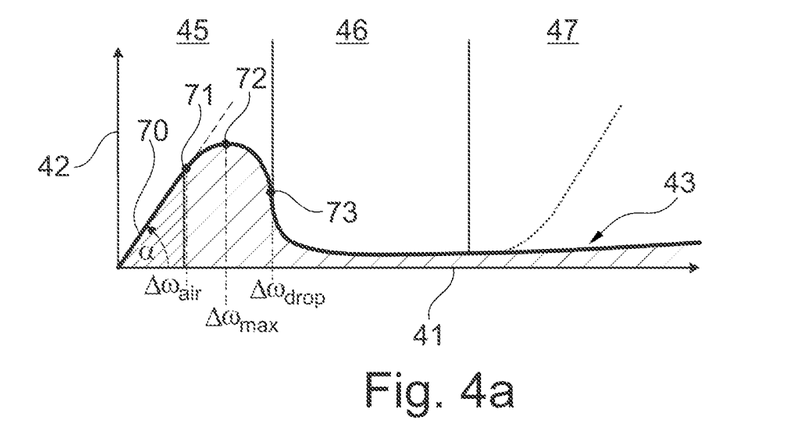
FIGS. 4a-4c show drag torques of multiple disc clutches/brakes.

A Cartesian coordinate diagram with an X-axis 41 and a Y-axis 42 is shown in FIG. 4*a*. A speed difference is plotted on the X-axis 41 in a suitable speed unit. A drag torque is plotted on the Y-axis 42 in a suitable unit. A curve 43 shows a drag torque curve in different sections 45, 46 and 47. There is a linear course 70 up to a point 71. After a maximum 72 there is a drop 73 in the drag torque curve. A dotted line indicates relative movements, in particular wobbling movements of the discs, which lead to a renewed increase in the drag torque.

Figure 4B:
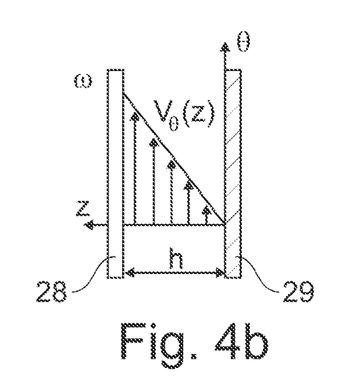
Figure 4C:
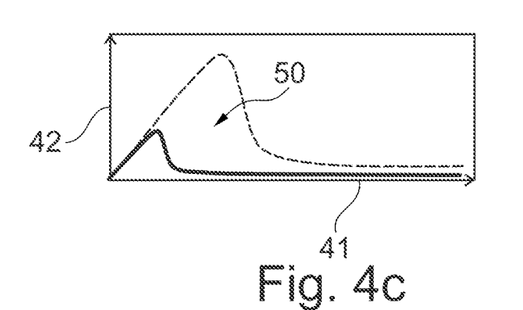

FIG. 4*b* shows a shear flow of oil between a friction disc 28 and a steel disc 29. A shift 50 of an air intake to low speeds is indicated in FIG. 4*c*. A suitable groove pattern is intended to improve the oil removal of the brake and thus the drag losses.

Figure 4D:
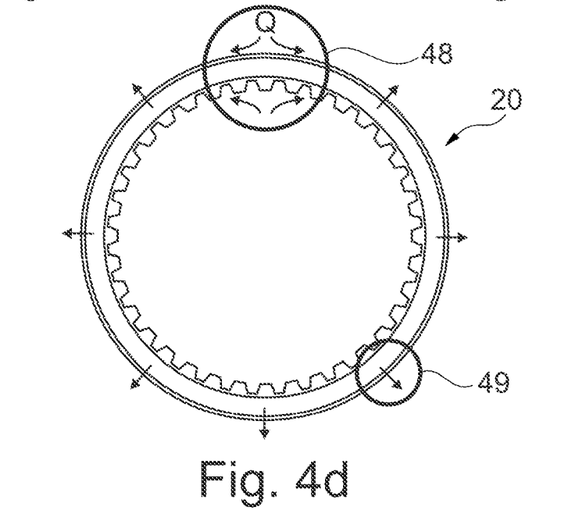
FIG. 4d shows oil removal in an open state of the friction disc with external oiling.

A circle 48 in FIG. 4*d* indicates that oiling when the multiple disc brake 20 is in the open state should be reduced or minimized as far as possible, namely advantageously by means of a suitable groove pattern. In a circle 49, the oil removal is indicated by an arrow. When the multiple disc brake 20 is in the open state, rapid oil removal/spinning free is desirable. Both the separation of the discs and the oil removal can be assisted by the groove pattern.

Cooling in the Closed State (No Rotation) (FIG. 3, FIG. 10)

The design of the groove pattern facilitates the cooling oil supply from the outside by means of a low flow resistance, and a targeted oil flow minimizes early outflow of the cooling oil from the friction system on the one hand and enables uniform cooling over the circumference of the friction system on the other (improvement of convective cooling). This can improve the thermal balance of the shifting element and reduce cooling times.

Drag Losses in the Open State (FIG. 4, FIG. 10)

By taking into account the interdependencies of the air intake/separation behavior and their effect on drag losses, the design of the groove pattern (influencing the pressure level/distribution in the lubrication gap) can minimize drag losses. At the same time, additional passive oiling of the friction system from the inside of the transmission is reduced. This supports the goal of a low-loss multiple disc brake as a shifting and separating element for hybrid modules and e-axles.

Figure 5A:
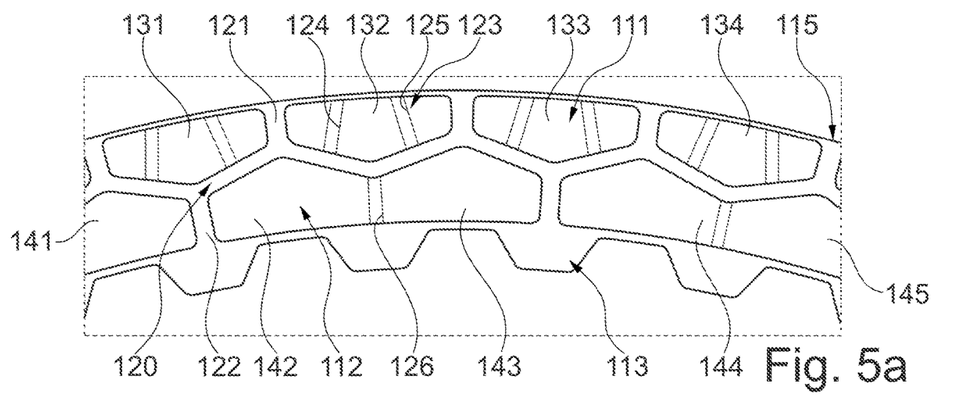
FIGS. 5a and 5b show groove patterns for friction systems with external lubrication.
Figure 5B:
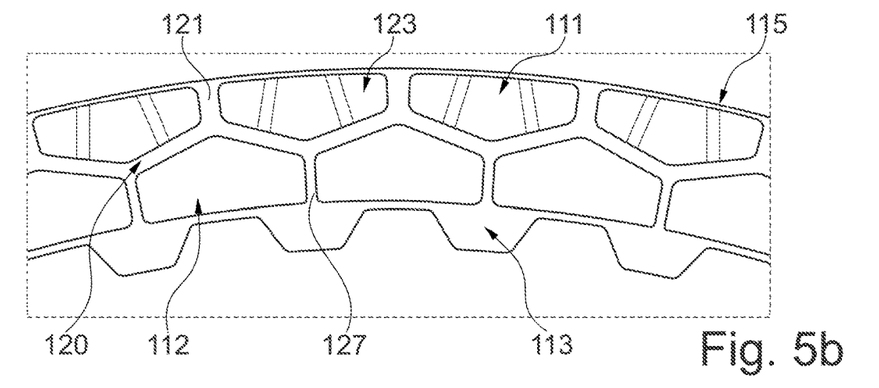

Functional Description of Groove Patterns for Friction Systems with External Lubrication (FIGS. 5*a*-5*b*)

Drag Losses—Open State

Groove cross-sectional area increasing from inside to outside—diffuser effect. Improved oil removal in the open state of the brake (rotation of the friction discs). This creates an additional pressure reduction in the groove/lubrication gap between the discs and thus shifts the air intake to low speeds. The drag torque can thus be reduced.

Indirect oiling from the inside is reduced due to the reduced flow cross-section at the inner diameter. This can additionally support the oil removal of the friction system in the open state and reduce drag losses.

Friction Value Build-Up—Closing State

Improved friction value build-up due to effective oil removal in the lubrication gap through optimized over-embossing of the outer row of pads (Pad1). Aggregated enlarged pads of the inner row of pads are also over-embossed for improved oil removal.

Cooling—Closed State

Wide groove channels 121 of the outer row of pads promote oil supply from the outside in the closed state of the brake. Curved zigzag groove 120 centered for distribution of cooling oil over the circumference of the friction system. The reduced flow cross-section on the inner ring 122, e.g., by combined pads 112 as in FIG. 5*a*, reduces the flow of cooling oil out of the friction contact. The cooling oil supplied from the outside can be optimally guided to the surface of the counter friction disc by means of a coordinated over-embossing 125. This leads to improved distribution of the cooling oil and increases the contact area for convective heat transfer between the cooling oil and the steel disc.

FIGS. 5 through 10 illustrate a groove pattern 115 in various embodiments. The groove pattern 115 comprises first friction lining pads 111 and second friction lining pads 112. The friction lining pads 111, 112 are arranged on a carrier disc 113. The carrier disc 113 with the friction lining pads 111, 112 is referred to as the friction disc.

The first and second pentagonal friction lining pads 111, 112 each have a rectangular geometry with an immediately adjacent triangular geometry. Peaks of the triangular geometry of the first pentagonal friction lining pads 111 are directed radially inwards. Peaks of the triangular geometry of the second pentagonal friction lining pads 112 are directed radially outwards.

A circumferential groove 120 extends radially in the circumferential direction between the first friction lining pads 131 to 134 and the second friction lining pads 141 to 145. The arrangement and shape of the first pentagonal friction lining pads 111 and the second pentagonal friction lining pads 112 results in a zigzag or undulating course of the circumferential groove 120.

A first radial groove 121 is arranged between two adjacent first friction lining pads 131, 132 in each case. A second radial groove 122 is arranged between two adjacent second friction lining pads 141, 142 in each case.

The first pentagonal friction lining pads 111 are provided with a V-shaped double groove 123, as can be seen in FIG. 5*a* using the example of the first friction lining pad 132. The V-shaped double groove 123 comprises two V-shaped embossed grooves 124 and 125 in the first friction lining pad 132.

FIG. 5*a* further shows that two second friction lining pads 142, 143 and 144, 145 are integrally connected to each other in each case. The integrally connected second friction lining pads 142, 143 and 144, 145 are divided by only one embossed groove 126 in each case. The embossed groove 126 replaces a radial groove 127 designed as a segmentation groove shown in FIG. 5*b*.

Figure 6A:
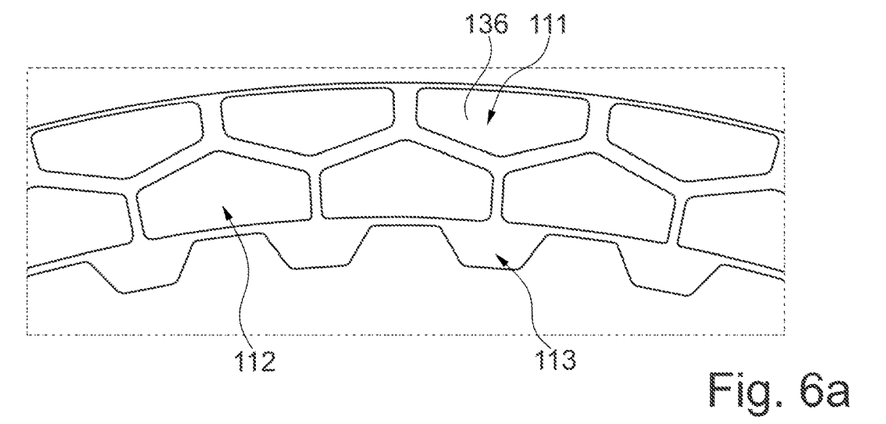
FIGS. 6a-6i show groove patterns for friction systems with external lubrication.
Figure 6B:
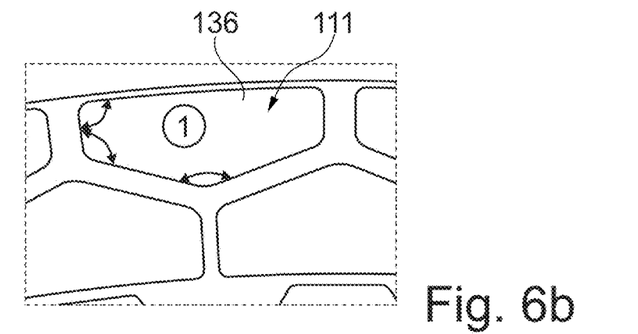
Figure 6C:
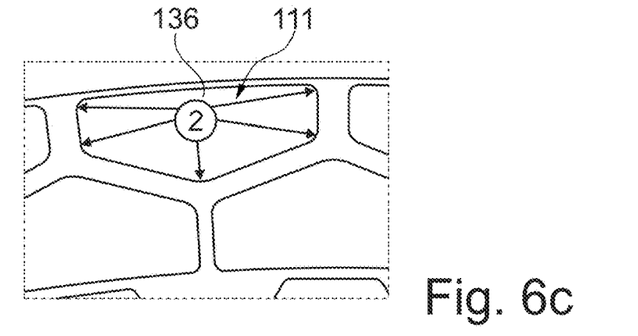

FIG. 6*a* shows that the first pentagonal friction lining pads 111 and the second pentagonal friction lining pads 112 can also be designed without embossed grooves. In FIG. 6*b*, pad inner angles 1 are drawn in the first friction lining pad 136. The pad inner angles 1 may be between ninety and one hundred and fifty degrees. FIG. 6*c* illustrates that pad outer edges are provided with rounding radii 2, which may be greater than or equal to one millimeter.

Figure 6D:
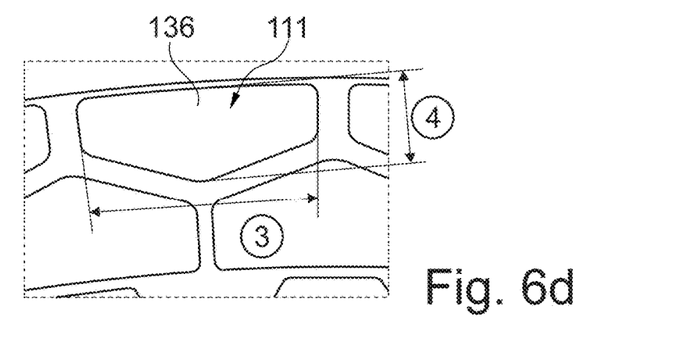

In FIG. 6*d*, a double arrow 3 indicates a width of the first friction lining pad 136. A height 4 of the first friction lining pad 136 is indicated by a double arrow 4. A width 3 to height 4 ratio of the first pentagonal friction lining pads 111 is between one and three, e.g., 2.58.

Figure 6E:
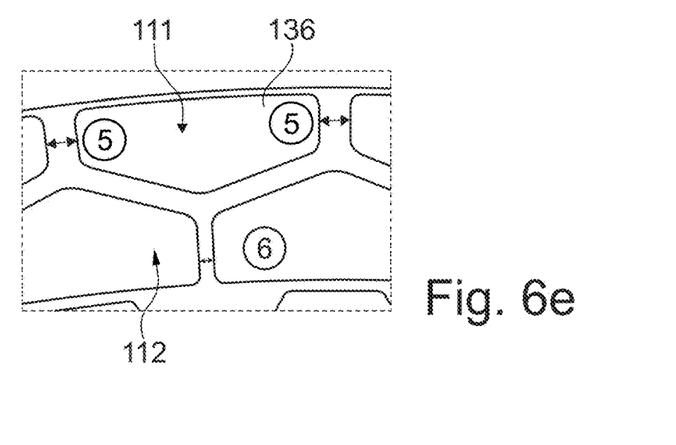

In FIG. 6*e*, double arrows 5 indicate an outer flow cross-section between the first pentagonal friction lining pads 111. The outer flow cross-section 5 is larger than an inner flow cross-section 6 indicated by a double arrow between two second pentagonal friction lining pads 112.

Figure 6F:
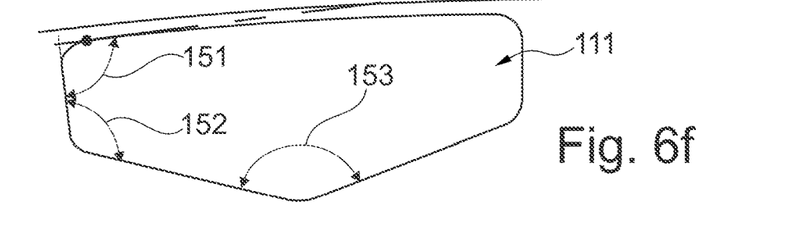

In FIG. 6*f*, pad inner angles 151 to 153 of a first pentagonal friction lining pad 111 are indicated. The angle 151 is ninety degrees. The angle 152 is 110.9 degrees. The angle 153 is 145.7 degrees.

Figure 6G:
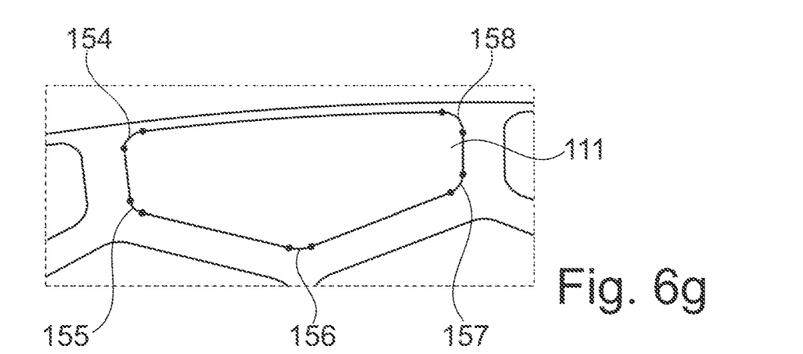

In FIG. 6*g*, rounding radii 154 to 158 are indicated. The rounding radii 154, 155, 157 158 are one millimeter. The rounding radius 156 is two millimeters.

Figure 6H:
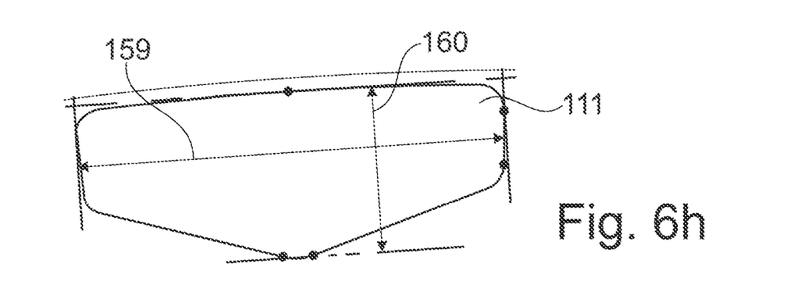

In FIG. 6*h*, double arrows 159, 160 indicate a width and a height of the first pentagonal friction lining pad 111. The width 159 is sixteen millimeters. The height 160 is 6.2 millimeters.

Figure 6I:
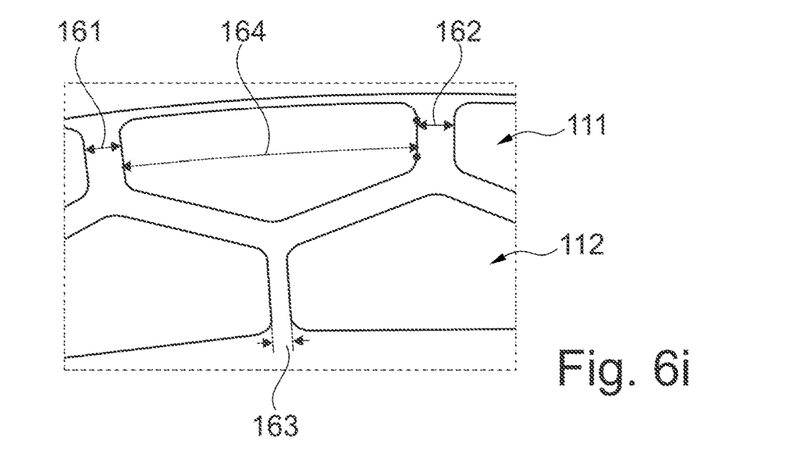

In FIG. 6*i*, double arrows 161, 162 indicate widths of radial grooves between the first pentagonal friction lining pads 111. The widths 161, 162 are two millimeters. The width 164 of the first friction lining pad arranged therebetween is sixteen millimeters. A width of a radial groove between two adjacent second friction lining pads 112 is indicated by dimension arrows at 163 and is one millimeter.

Figure 7A:
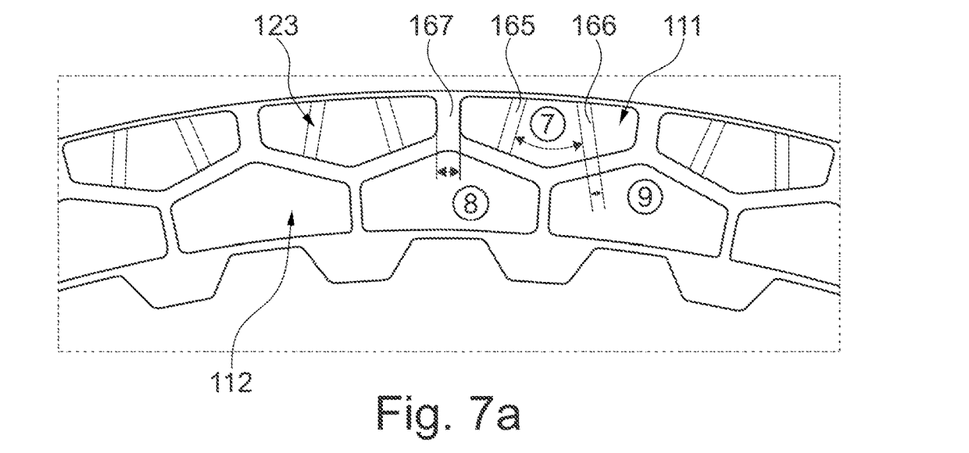
FIGS. 7a-7c show groove patterns for friction systems with external lubrication.

FIG. 7*a* shows a groove angle 7 between two embossed grooves 165, 166 of a V-shaped double groove. A first radial groove 167 has a width 8. The embossed groove 166 has a width 9. The groove angle 7 is between twenty and thirty degrees. The groove angle 7 may be 24.3 degrees. The width 9 of the embossed groove 166 is smaller than the width 8 of the radial groove 167. An embossing depth of the embossed groove 166 at most corresponds of one half of the lining thickness of the respective friction lining pad.

Figure 7B:
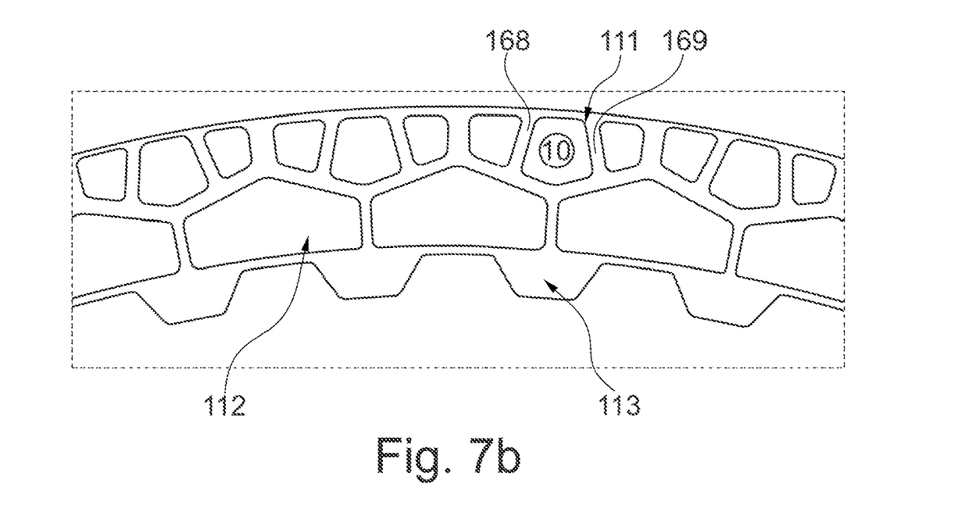

In FIG. 7*b*, it is indicated at 10 that the first pentagonal friction lining pads 111 can also be segmented into three parts. Corresponding segmentation grooves are designated with 168 and 169.

Figure 7C:
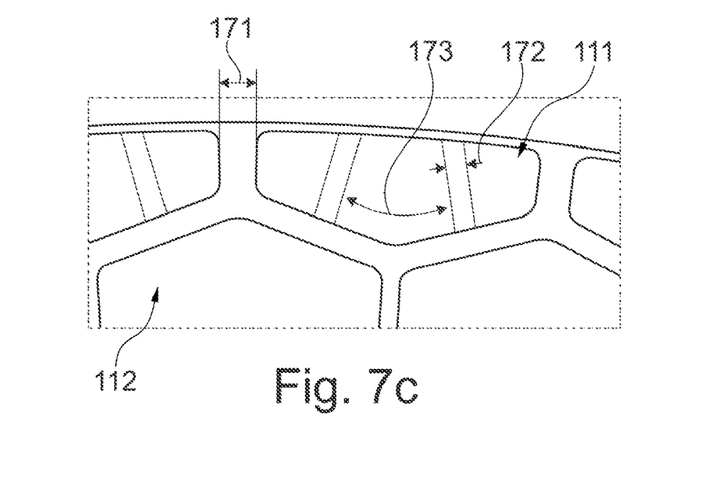

FIG. 7*c* shows groove widths 171 and 172. The groove width 171 of the corresponding radial groove is two millimeters. The groove width 172 of the corresponding embossed groove in the first friction lining pad 111 is 1.2 millimeters. The groove angle 173 is 24.3 degrees. The V-shaped double groove can be embossed, milled or punched.

Figure 8A:
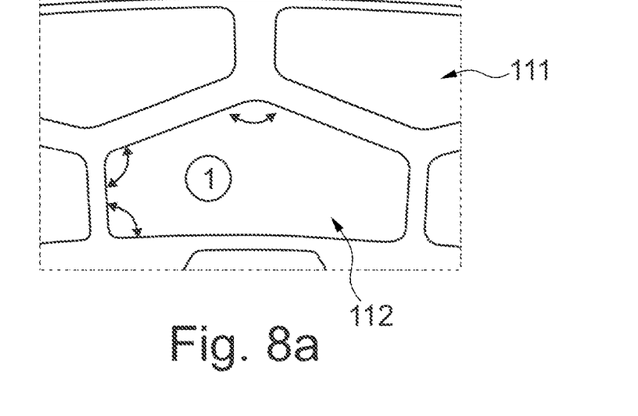
FIGS. 8a-8f show groove patterns for friction systems with external lubrication.
Figure 8B:
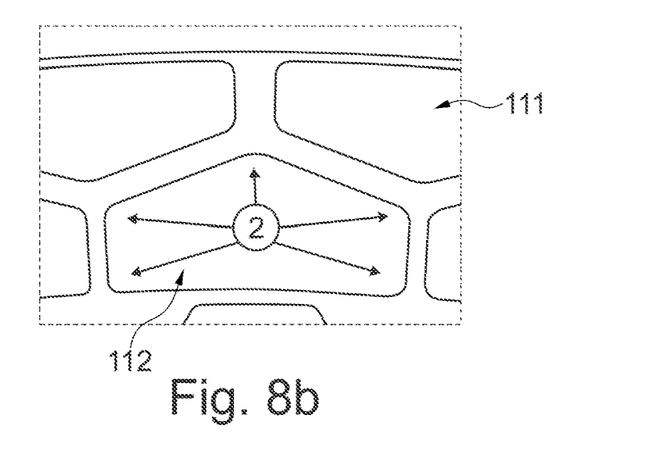
Figure 8C:
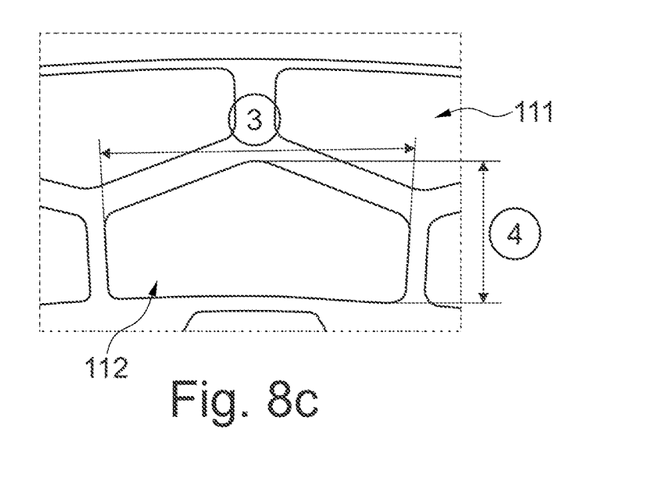

In FIG. 8*a*, pad inner angles 1 are shown on one of the second pentagonal friction lining pads 112. In FIG. 8*b*, rounding radii 2 of the second pentagonal friction lining pads 112 are shown. In FIG. 8*c*, a width 3 and a height 4 of the second pentagonal friction lining pads 112 are shown.

Figure 8D:
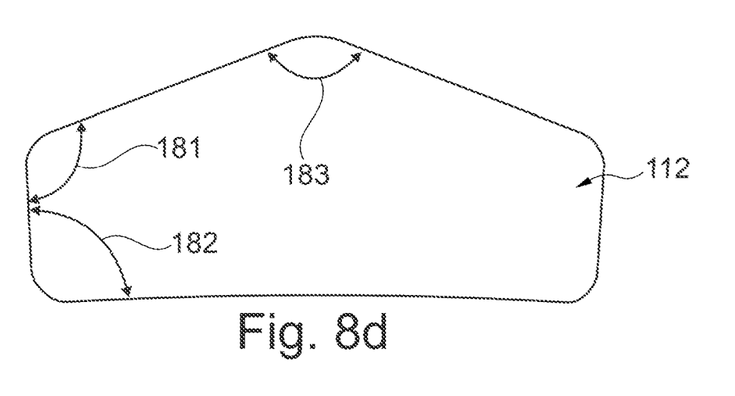

The pad inner angles 1 are between ninety and one hundred and fifty degrees. The rounding radii 2 are greater than or equal to one millimeter. A width 3 to height 4 ratio of the second friction lining pads 112 is between one and three, e.g., 2.33. The pad inner angle 181 in FIG. 8*d* is 107.1 degrees. The pad inner angle 182 is 90.7 degrees. The pad inner angle 183 is 138.2 degrees.

Figure 8E:
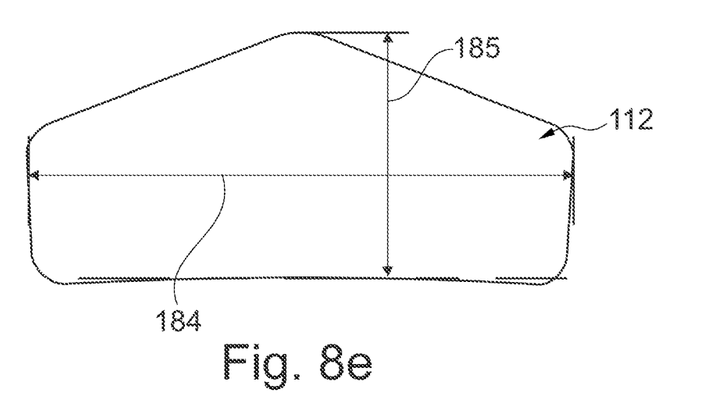

The width 184 in FIG. 8*e* is sixteen millimeters. The height 185 in FIG. 8*e* is 7.2 millimeters.

Figure 8F:
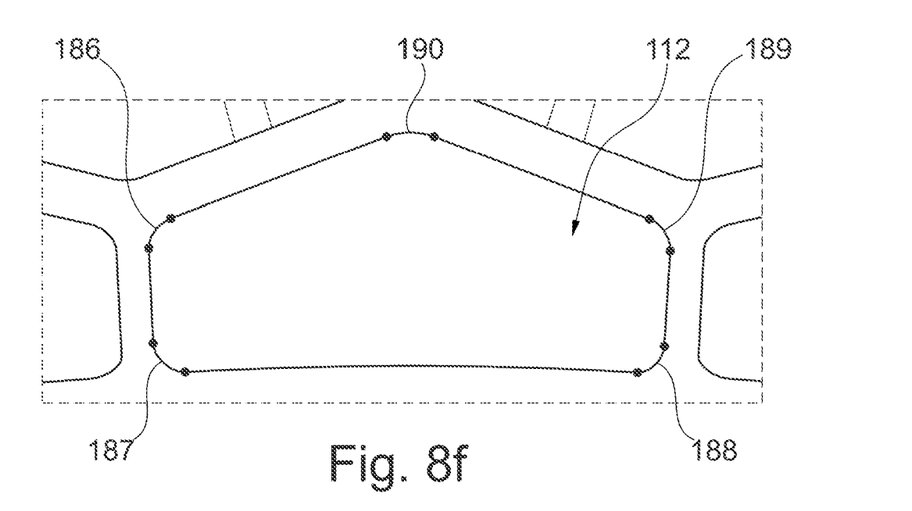

In FIG. 8*f*, the rounding radii 186 to 189 are one millimeter. The rounding radius 190 is two millimeters.

Figure 9A:
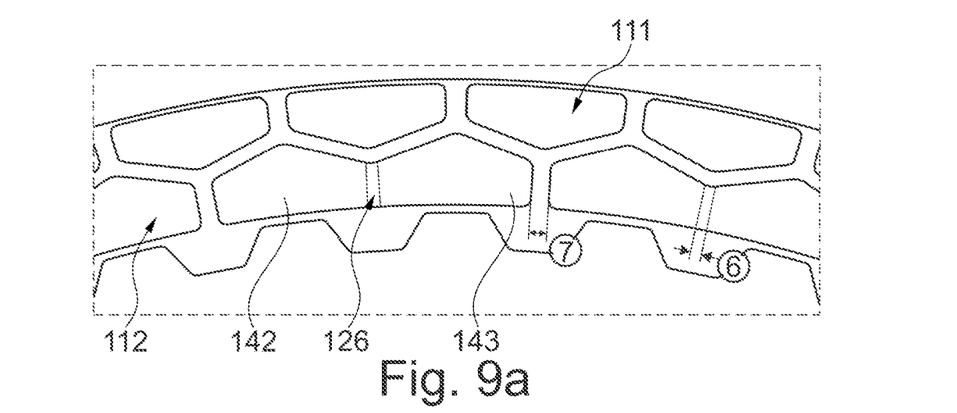
FIGS. 9a-9d show groove patterns for friction systems with external lubrication.
Figure 9B:
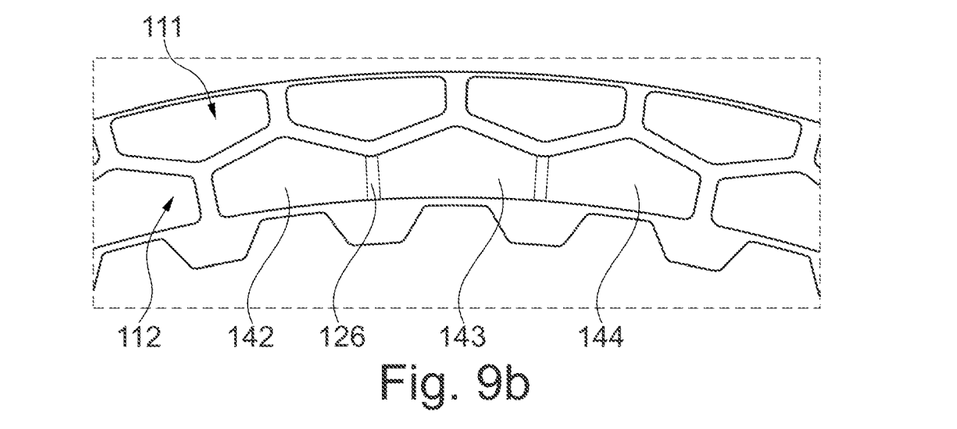
Figure 9C:
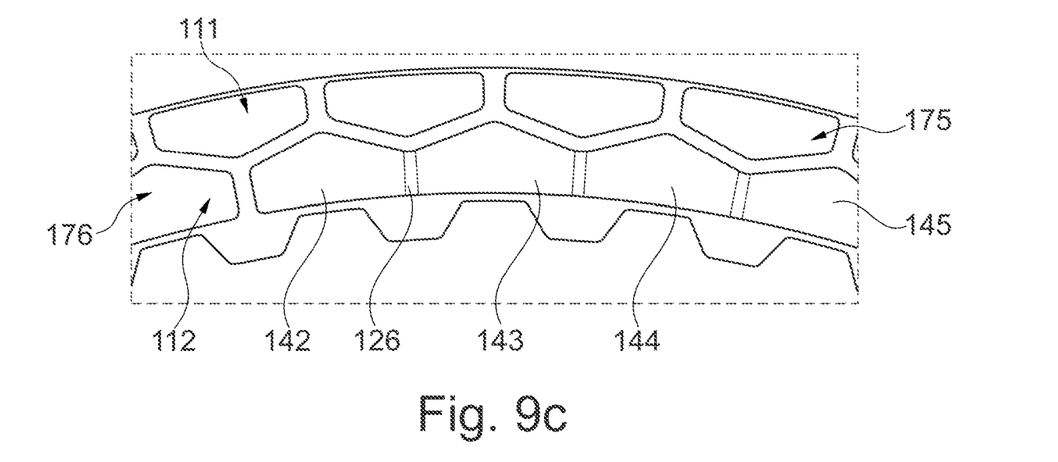

In FIG. 9*a*, it is indicated that two second friction lining pads 142, 143 are integrally connected to each other in each case. FIG. 9*b* shows that three second friction lining pads 142 to 144 are integrally connected to each other in each case. FIG. 9*c* shows that four friction lining pads 142 to 145 are integrally connected to each other in each case. The integrally connected second friction lining pads are each divided only by embossed grooves 126.

Figure 9D:
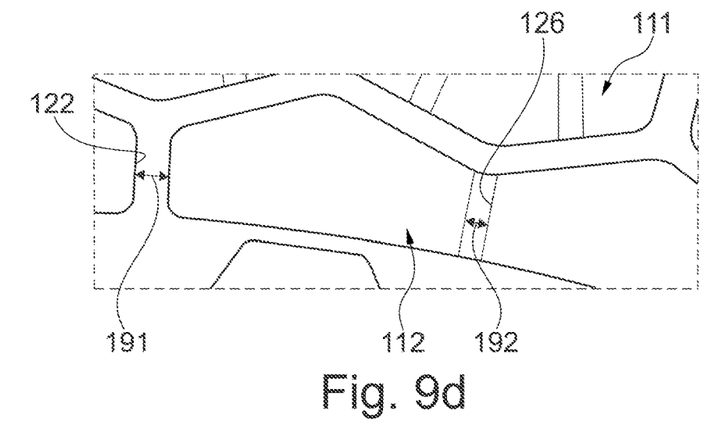

In FIG. 9*d*, a groove width 191 of a second radial groove 122 designed as a segmentation groove is 1.8 millimeters. A groove width 192 of the embossed groove 126 is 1.2 millimeters.

Figure 10A:
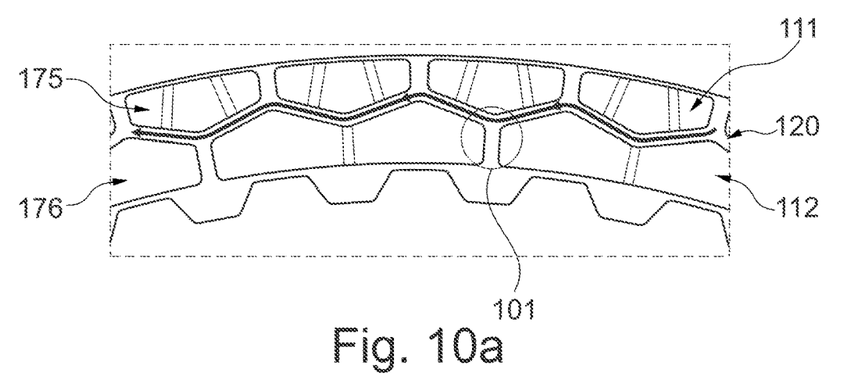
FIG. 10a shows schematic cooling oil flow in the closed state of a groove pattern for friction systems with external lubrication.

In FIG. 10*a*, a looped arrow indicates a schematic cooling oil flow in the closed state of the friction system. In a region 101, the cooling oil flow can be maintained in the friction system due to the low segmented inner ring or due to a reduced flow cross-section on the inner ring and the curved tangential groove. Outflow to the outside and inside can be minimized.

Figure 10B:
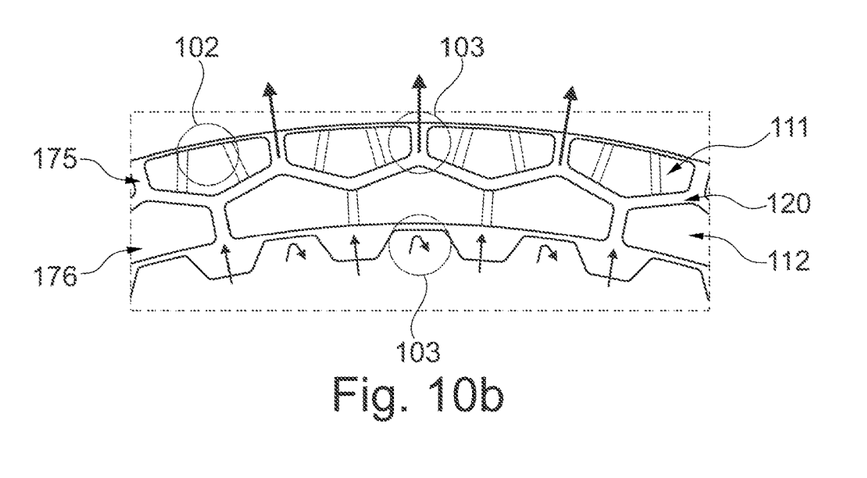
FIG. 10b shows schematic oil removal in the open/closing state of a groove pattern for friction systems with external lubrication.

In FIG. 10*b*, a schematic oil removal in the open and closed state is illustrated by arrows. In a region 102, there is an improvement in the friction value build-up due to effective oil removal in the lubrication gap in the segmentation as well as in the over-embossing. Thus, a smooth closing of the friction system can be realized during actuation.

In the regions 103, a diffuser effect can be realized by the groove cross-sectional area increasing from the inside to the outside. This can improve the air intake. In addition, drag losses can be reduced.

A coordinated segmentation of the inner ring can reduce indirect oiling from the inside. This additionally allows air to enter the lubrication gap.

REFERENCE NUMERALS

1 Pad inner angle
2 Rounding radii
3 Widths
4 Heights
5 Outer flow cross-section
6 Inner flow cross-section
7 Groove angle
8 Width
9 Width
10 Pad variant
20 Multiple disc brake
21 Lubrication system
22 Lubrication system
23 Lubrication system
24 Arrow
25 Double arrow
26 Arrow (external oiling)
27 Inner multiple disc carrier
28 Friction disc
29 Steel disc
30 Outer multiple disc carrier
31 X-axis
32 Y-axis
33 Rotational axis 34 Frictional surface
35 Internal toothing
36 Circle
37 Circle
38 Speed drop
39 Speed increase
40 Rectangle
41 X-axis
42 Y-axis
43 Curve
44 Temperature distribution
45 Section
46 Section
47 Section
48 Circle
49 Circle
50 Shift
61 Friction disc
62 Groove pattern
63 Groove pattern
64 Groove pattern
65 Groove pattern
66 Groove pattern
67 Groove pattern
68 Groove pattern
69 Groove pattern
70 Linear course
71 Point
72 Maximum
73 Drop
101 Region
102 Region
103 Regions
111 First pentagonal friction lining pads
112 Second pentagonal friction lining pads
113 Carrier disc
115 Groove pattern
120 Circumferential groove
121 First radial groove
122 Second radial groove
123 Double groove
124 Embossed groove
125 Embossed groove
126 Embossed groove
127 Segmentation groove
131 First friction lining pad
132 First friction lining pad
133 First friction lining pad
134 First friction lining pad
141 Second friction lining pad
142 Second friction lining pad
143 Second friction lining pad
144 Second friction lining pad
145 Second friction lining pad
151 Pad inner angle
152 Pad inner angle
153 Pad inner angle
154 Rounding radius
155 Rounding radius
156 Rounding radius
157 Rounding radius
158 Rounding radius
159 Width
160 Height
161 Groove width
162 Groove width
163 Groove width
164 Width
165 Embossed groove
166 Embossed groove
167 Radial groove
168 Segmentation groove
169 Segmentation groove
171 Groove width
172 Groove width
173 Groove angle
175 First row of pads
176 Second row of pads
181 Pad inner angle
182 Pad inner angle
183 Pad inner angle
184 Width
185 Height
186 Rounding radius
187 Rounding radius
188 Rounding radius
189 Rounding radius
190 Rounding radius
191 Groove width
192 Groove width

The invention claimed is:

1. A groove pattern for an annular wet friction system having external lubrication, comprising a frictional surface having a circumferential groove extending circumferentially in a zigzag or undulating manner, wherein:
   the circumferential groove is arranged, in a radial direction, between first pentagonal friction lining pads arranged radially outwards in a first row of pads and second pentagonal friction lining pads arranged radially inwards in a second row of pads;
   the first and second pentagonal friction lining pads have a rectangular geometry with an immediately adjacent triangular geometry;
   tips of the triangular geometry of the first pentagonal friction lining pads are directed radially inwards and tips of the triangular geometry of the second pentagonal friction lining pads are directed radially outwards;
   first radial grooves are arranged in a circumferential direction between the first pentagonal friction lining pads and second radial grooves are arranged in the circumferential direction between the second pentagonal friction lining pads;
   the tips of the triangular geometry of the first pentagonal friction lining pads face the second radial grooves and the tips of the triangular geometry of the second pentagonal friction lining pads face the first radial grooves;
   the first pentagonal friction lining pads have a V-shaped double groove comprising two stamped grooves spaced apart in the circumferential direction with a distance therebetween decreasing radially outwards;
   an angle between the two stamped grooves is between twenty (20) degrees and thirty (30) degrees; and
   the two stamped grooves each extend uninterruptedly from an outer edge of the first pentagonal friction lining pad towards an outer edge of a respective second pentagonal friction lining pad and open into the circumferential groove.

2. The groove pattern according to claim 1, wherein two second pentagonal friction lining pads are integrally connected to each other and are divided only by an embossed groove.

3. The groove pattern according to claim 1, wherein pad inner angles in pad corners of the first and second pentagonal friction lining pads are between ninety and one hundred and fifty degrees.

4. The groove pattern according to claim 1, wherein the first and second pentagonal friction lining pads have widths and heights that have a width to height ratio that is greater than one and less than three.

5. The groove pattern according to claim 1, wherein a radial flow cross-section between the first pentagonal friction lining pads is larger than a radial flow cross-section between the second pentagonal friction lining pads.

\* \* \* \* \*